(12) United States Patent
Flack et al.

(10) Patent No.: US 9,052,934 B2
(45) Date of Patent: Jun. 9, 2015

(54) REMOTE COMMAND INTERPRETER

(75) Inventors: Marcus Laronne Flack, Peoria, AZ (US); Xingtao Wang, Gilbert, AZ (US)

(73) Assignee: Fluke Corporation, Everett, WA (US)

( * ) Notice: Subject to any disclaimer, the term of this patent is extended or adjusted under 35 U.S.C. 154(b) by 1472 days.

(21) Appl. No.: 12/419,997

(22) Filed: Apr. 7, 2009

(65) Prior Publication Data

US 2009/0326909 A1    Dec. 31, 2009

Related U.S. Application Data

(60) Provisional application No. 61/077,089, filed on Jun. 30, 2008.

(51) Int. Cl.
  *G06F 9/455*    (2006.01)
(52) U.S. Cl.
  CPC ........ *G06F 9/45508* (2013.01); *G06F 9/45512* (2013.01)
(58) Field of Classification Search
  USPC ................ 703/23, 24, 26; 709/203, 217, 230
  See application file for complete search history.

(56) References Cited

U.S. PATENT DOCUMENTS

| | | | |
|---|---|---|---|
| 5,410,681 A * | 4/1995 | Jessen et al. ................... 703/27 |
| 5,640,537 A * | 6/1997 | Jessen et al. ................... 703/23 |
| 5,669,000 A * | 9/1997 | Jessen et al. .................. 717/127 |
| 5,734,871 A * | 3/1998 | Kleinerman et al. ......... 719/320 |
| 5,892,939 A * | 4/1999 | Call et al. ........................ 703/23 |
| 6,097,498 A * | 8/2000 | Debry et al. .................. 358/1.13 |
| 6,351,844 B1 * | 2/2002 | Bala .............................. 717/128 |
| 6,407,779 B1 * | 6/2002 | Herz .............................. 348/734 |
| 6,438,619 B1 * | 8/2002 | Coman ......................... 719/319 |
| 6,636,929 B1 * | 10/2003 | Frantz et al. ................. 710/313 |
| 6,978,447 B1 * | 12/2005 | Okmianski ................... 717/139 |
| 7,097,099 B2 * | 8/2006 | Hepworth et al. ........... 235/435 |
| 7,921,415 B1 * | 4/2011 | Bodell et al. ................. 717/139 |
| 2002/0184400 A1 * | 12/2002 | Coman ......................... 709/310 |
| 2003/0144976 A1 * | 7/2003 | Brady et al. ................... 706/46 |
| 2004/0254014 A1 * | 12/2004 | Quraishi et al. ............... 463/29 |
| 2005/0086341 A1 * | 4/2005 | Enga et al. .................... 709/224 |
| 2005/0275678 A1 * | 12/2005 | Ferlitsch ........................ 347/19 |
| 2006/0123129 A1 * | 6/2006 | Toebes et al. ................. 709/230 |
| 2006/0138236 A1 * | 6/2006 | Hepworth et al. ........... 235/454 |
| 2007/0005867 A1 * | 1/2007 | Diamant ....................... 710/306 |
| 2007/0043928 A1 * | 2/2007 | Panesar et al. ............... 711/206 |
| 2007/0076748 A1 * | 4/2007 | Nakagawa .................... 370/463 |
| 2007/0299650 A1 * | 12/2007 | Tamayo et al. ................ 703/27 |
| 2008/0040713 A1 * | 2/2008 | Subbakrishna et al. ...... 717/173 |
| 2008/0072103 A1 * | 3/2008 | Lou ................................ 714/38 |
| 2011/0016459 A1 * | 1/2011 | Meyers et al. ............... 717/139 |
| 2013/0232477 A1 * | 9/2013 | Griffin ......................... 717/158 |
| 2013/0326489 A1 * | 12/2013 | Eijndhoven et al. ......... 717/139 |

\* cited by examiner

*Primary Examiner* — Kibrom K Gebresilassie
(74) *Attorney, Agent, or Firm* — Christenson O'Connor Johnson Kindness PLLC (57) ABSTRACT

A host instrument is disclosed that is capable of supporting non-native command sets. The host instrument uses interpretation rules to translate a non-native command into one or more actions. The host instrument also uses the interpretation rules to determine the appropriate responses to be transmitted, if any. The actions and responses of the host instrument emulate those of an alternate instrument that supports the command set.

24 Claims, 6 Drawing Sheets

REMOTE COMMAND INTERPRETER

CROSS-REFERENCE TO RELATED APPLICATIONS

This application claims the benefit of the following application which is incorporated by reference, U.S. Provisional Application No. 61/077,089, entitled "REMOTE COMMAND INTERPRETER", filed Jun. 30, 2008.

TECHNICAL FIELD

The present disclosure relates to interpreting non-native commands on a host instrument to simulate the actions and responses of another instrument.

BACKGROUND

System automation generally requires the use of instruments that have a remote interface. For facilitating control of some instruments, manufacturers often build in support for remote command sets that are associated with controlling other instruments.

Traditionally, command emulation is managed by creating a command parser that supports all or nearly all of the command rules of the instrument being emulated. In this manner, the host instrument can respond and react to commands in the same way as the emulated instrument. However, the host instrument must obtain a new revision of software to support changes to the emulated instrument. Additionally, emulating a large number of alternate instruments consumes a significant amount of internal instrument memory in the host instrument and may adversely impact the performance of the host instrument in parsing standard native commands. Furthermore, a manufacturer of a host instrument may not be informed of changes to commands for the emulated instrument.

SUMMARY

A host instrument is programmed to support externally defined command interpretation rules. The rules are downloaded to the host instrument without altering the firmware of the host instrument. The host instrument uses the interpretation rules to translate a non-native command into one or more actions. The host instrument may also use the interpretation rules to determine any appropriate responses to be transmitted. The actions and responses of the host instrument emulate those of an alternate instrument that supports the command set. An automation system will function unaltered when it uses the host instrument with the interpretation rules instead of the emulated instrument.

BRIEF DESCRIPTION OF THE DRAWINGS

Examples of a remote command interpreter system and method are illustrated in the figures. The examples and figures are illustrative rather than limiting.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Manufacturers of instruments typically devise a particular command set for controlling the instrument in a remote interface associated with the instrument. When a user purchases the instrument, he will often write and use custom software for applications that are adapted specifically to that instrument. Because writing and testing the software is time-consuming, other instruments may never be considered for use by that user because the user does not have the budget or time to modify the user's existing software to adapt for use in a new instrument.

One solution to this difficulty has been to design emulation systems for emulating the remote command sets of a product. Using the instrument to be emulated and its manual, the emulating manufacturer considers every possible combination of how each command is used, how the instrument responds, and the different interfaces that can be used to communicate with the instrument. Finally, the emulating manufacturer duplicates everything that the emulated instrument performs in the host instrument.

The duplication requires programming logic into the main code base of the host instrument, thus making the firmware cumbersome and inefficient. In addition, for each new instrument that is emulated by the host instrument, customized firmware changes are needed in the host instrument. Moreover, radically different sets of remote commands may be used by a single manufacturer for versions of the same instrument, even within a relatively short time span of a few years. Thus, further edits to the firmware of the host instrument are needed to maintain compatibility with applications intended for emulated instruments.

Rather than emulating or dynamically building in the command sets from other instruments in the host instrument firmware every time a new command set is released, as described herein, a single interpretation parser can be programmed in the host instrument. The interpretation parser supports the necessary logic to interact with both incoming remote commands and functions internal to the host instrument. Further, the interpretation parser supports scripting that defines how the parser will react to specific remote commands. A specific script defines a set of interpretation rules to emulate commands from another instrument.

A computer is used to define the interpretation rules to emulate another instrument or to make custom commands for the host instrument. The interpretation rules are composed of multiple scripts that initiate specific actions in the host instrument when a remote command is received. The interpretation rules allow the host instrument to react and respond to commands in any fashion desired or required. To allow a host instrument to replace an emulated instrument in an automation system, it may be necessary to not only respond in accordance to the emulated instrument, but to respond in a very specific manner. For example, an automation system may be designed to react differently when "talking to" an instrument having serial number "one" rather than serial number "two." Thus, the interpretation rules may be defined to force the host product to respond with a specific serial number opposed to its actual serial number.

Figure 1:
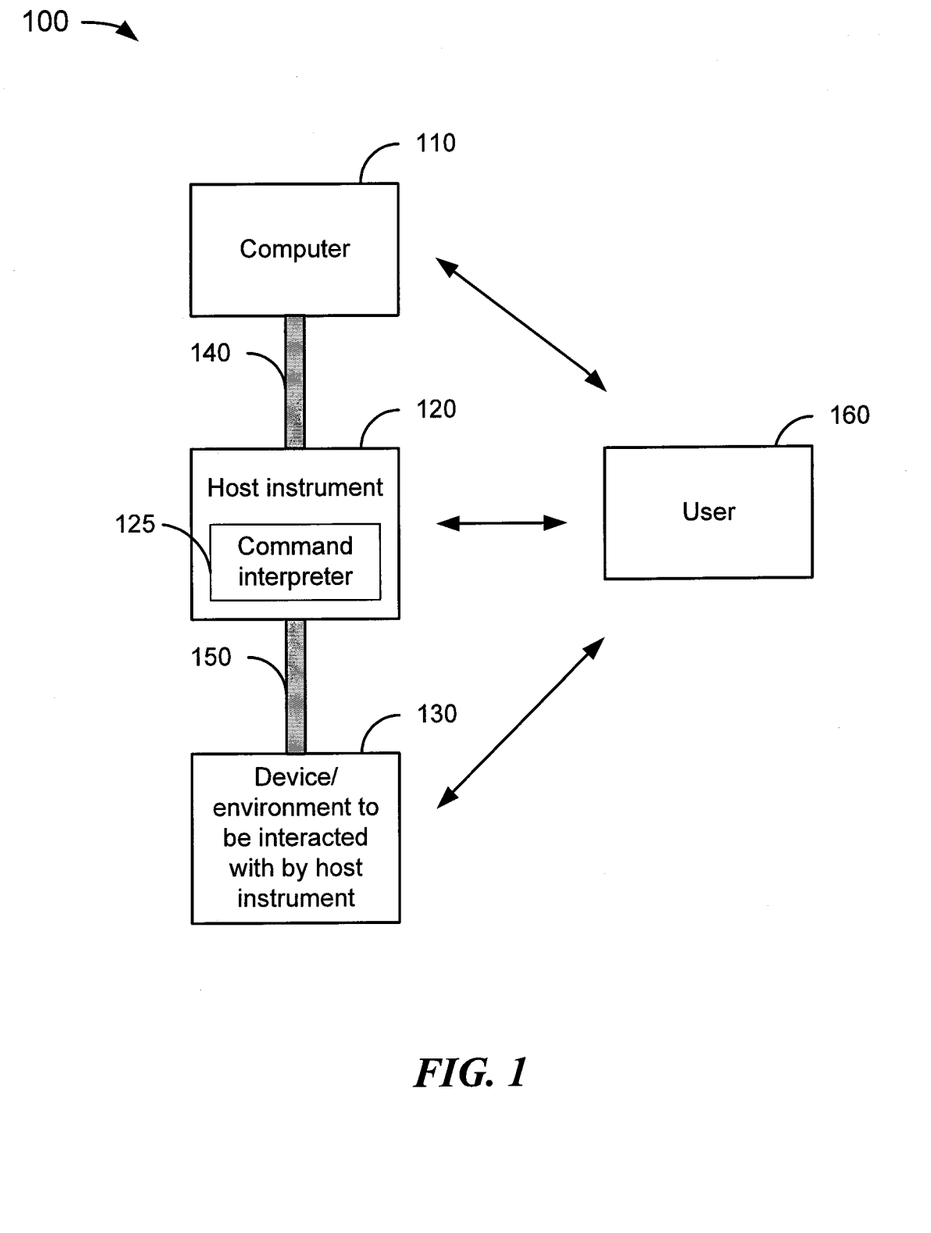
FIG. 1 depicts a block diagram illustrating an example of a system using a host instrument running a command interpreter for interpreting non-native commands, according to an embodiment of the disclosure.

FIG. 1 depicts a block diagram 100 showing an example of a system using a host instrument 120 running a command interpreter 125 for interpreting non-native commands supported by another instrument, according to one embodiment.

The host instrument 120 can be any combination of software agents and/or hardware modules used as an instrument such as a scientific instrument, measuring instrument, and/or analytical instrument. The host instrument 120 has a remote interface 140 to couple to an external computer 110, where the interface includes a physical topology and a set of remote commands or command protocol for interacting with the instrument. In one embodiment, the physical topology also defines the remote commands necessary to interact with the instrument. For example, instruments that use a HART or DeviceNet network provide users with a standard physical topology and a standard command set to automate the instrument. Other standard physical communication topologies including, but not limited to, IEEE-488, RS-232, and TCP/IP, may have a small set of standardized remote commands, but require non-standard product specific commands to interact with the instrument. Other non-limiting examples of a remote interface 140 include, but are not limited to, any other electrical, wireless, or optical connection.

The host instrument 120 has a command interpreter 125 that can be any combination of software agents and/or hardware modules that receives, stores, and applies one or more interpretation rules for interpreting one or more non-native command sets that are used by alternative instruments that may or may not be made by the same manufacturer as the host instrument's manufacturer. The interpretation rules include logical statements and special functions that translate a remote non-native command from a computer 110 into a specific action and/or trigger the host instrument 120 to return a custom response to the computer 110.

The computer 110 includes the following elements: one or more processors, memory units, input/output elements such as a keyboard, pointing device, display, or speakers, and an interface to couple to the host instrument 120. Of course, the computer 200 may include other elements. In one embodiment, a user may communicate with the computer 110 through the input/output elements to select one or more existing interpretation rules to download to the host instrument 120. In one embodiment, a simple point-and-click user interface is provided for defining and/or selecting the interpretation rules for one or more particular command sets. Users are able to define multiple custom commands for writing to the command interpreter 125 without requiring updating the firmware of the host instrument 120. Thus, by supporting the logical interpretation rules, any non-native remote command set may be processed by the host instrument.

The computer 110 may run a user's software application intended to run an alternate instrument, where the application may include a single non-native command or a series of non-native commands. The non-native commands are sent to the host instrument 120 through the remote interface 140. The software application will expect the host instrument 120 to perform as if it were the alternate instrument by performing designated actions and responding with the expected responses, for example readings taken or confirmations of actions performed.

In order to develop the interpretation rules, a set of properties and functions specific to the host instrument's internal workings are first established. Properties are discrete internal states of the instrument, while functions are supported actions that can be taken by the host instrument. Non-limiting examples of a property include the active unit of measure or instrument output. For the specific case of a pressure controller instrument, non-limiting examples of instrument specific interpretation functions include venting, setting a pressure, and aborting control. In one embodiment, a basic set of interpretation rules are provided by the manufacturer of the host instrument 120 to the user 160 for one or more particular alternate instruments.

The interpretation rules are supported by the firmware of the host instrument 120. The interpretation logic is used to parse a command and its arguments into discrete pieces that each define a change or query to a specific property or initiate a function in the host instrument. The interpretation rules are also used to formulate a response to a command based on the host instrument's internal properties.

In addition to instrument-specific properties and functions, the interpretation rules contain fundamental logic elements and standard functions that may be used in computer programming and mathematics, such as "if-then" programming constructs, less than, greater than, equal to, addition, subtraction, etc. A non-limiting example of a standard function is extraction of a piece of text or a specific numeric value in a text string. These standardized elements are used to manipulate incoming non-native commands into distinctive pieces that correspond to instrument specific actions and functions.

After all internal actions responsive to a command are taken by the host instrument, a second set of interpretation rules is used to derive the response to the remote non-native command. The rules as applied to the non-native command can be as simple as returning a constant or as complex as mathematically manipulating several internal properties and returning the resultant value.

The host instrument 120 is also coupled to a device or environment 130 to be acted upon through a second interface 150. Similar to the remote interface 140, the second interface 150 may include, but is not limited to, IEEE-488, RS-232, TCP/IP, and any other electrical, wireless, or optical connection.

The device or environment 130 acted upon by the host instrument 120 may include any combination of software agents and/or hardware modules. The actions taken by the host instrument 120 may include, but are not limited to, measuring a physical property such as voltage, speed, or pressure; analyzing complex material properties such as gas or liquid analysis; and controlling a physical parameter such as pressure or temperature. The device or environment 130 may be in a laboratory, factory, or any other location.

A user 160 can interact with the computer 110, host instrument 120, and device or environment 130. The user 160 can use the computer 110 to program and/or select interpretation rules for downloading to the command interpreter 125 in the host instrument 120. The user 160 can observe actions taken by the host instrument 120 and/or directly control the host instrument 120. The user 160 can also observe responses made by the device or environment 130 acted upon by the host instrument 120 and/or directly interact with the device or environment 130. The user 160 may be a person, a computer program, or other automated device.

Figure 2:
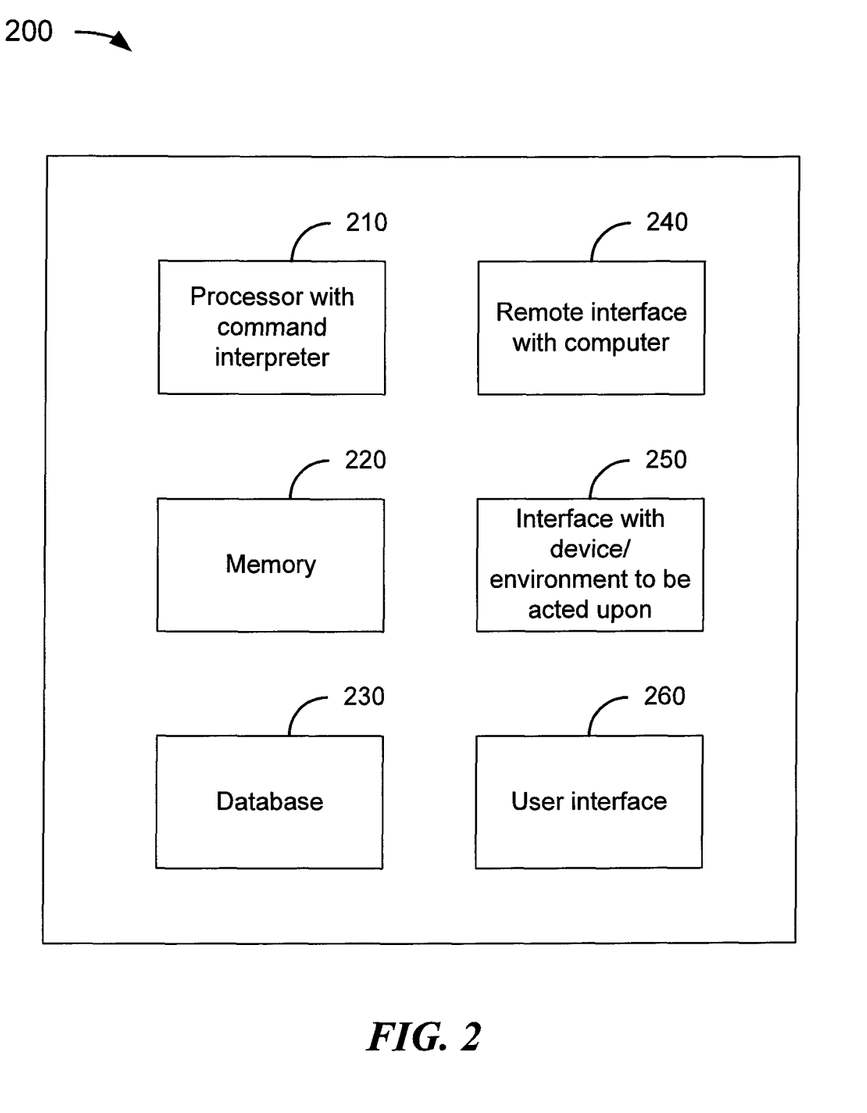
FIG. 2 shows a block diagram of a host instrument that runs a command interpreter, according to an embodiment of the disclosure.

FIG. 2 shows a block diagram 200 of a host instrument that runs a command interpreter, according to one embodiment. As shown in FIG. 2, the host instrument 120 includes the following elements for operating a command interpreter: one or more processors 210, memory units 220, and database 230, the remote interface 140, the second interface 150, and a user interface for direct control by a user 160. The host instrument 120 may include other elements, particularly elements specifically designed for instrumentation purposes.

The processor 210 may be used to run host instrument applications and the command interpreter application. The command interpreter application may be stored in the memory 220. Memory 220 may include but is not limited to, RAM, ROM, and/or any combination of volatile and non-volatile memory. Memory 220 can be a non-transitory computer-readable medium that carries instructions for a method to permit a user to edit a set of interpretation rules for a host instrument, such as the method given by FIGS. 4A and 4B. The database 230 may be stored in the memory 220, and may include one or more sets of interpretation rules for interpreting non-native commands for one or more alternate instruments.

The remote interface 240 coupling the host instrument 120 to the computer 110 and the second interface 250 coupling the host instrument 120 to the device or environment 130 to be acted upon have been described above. The user interface 260 includes, but is not limited to, a keyboard, pointing device, and joystick for directly controlling and interacting with the host instrument 120 and a display device for receiving information form the host instrument 120.

Figure 3:
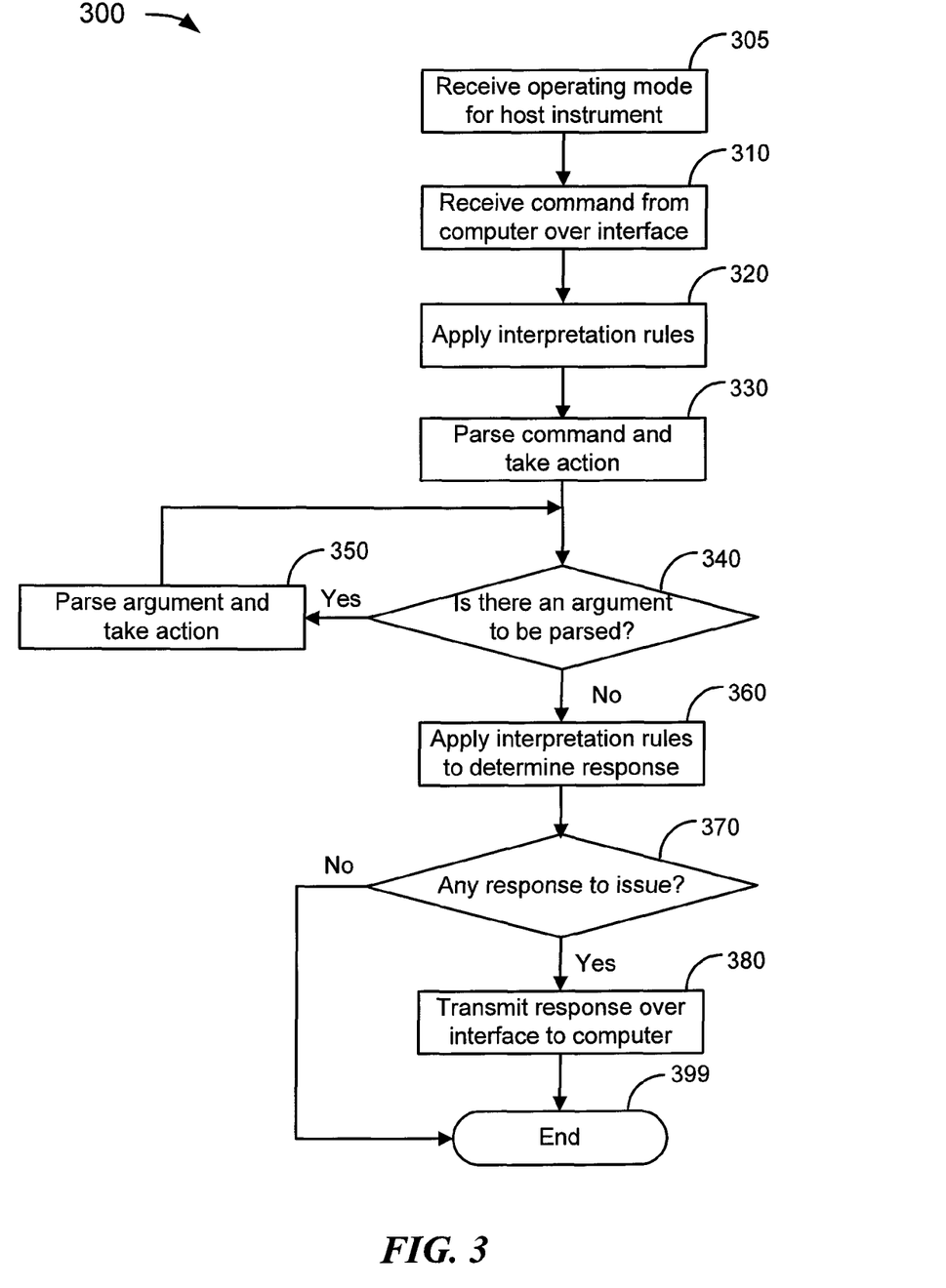
FIG. 3 depicts a flow diagram illustrating an exemplary process of interpreting a non-native command on a host instrument, according to an embodiment of the disclosure.

FIG. 3 depicts a flow diagram illustrating an exemplary process of interpreting a non-native command on a host instrument, according to one embodiment. A non-native command is a command from a command set supported by an instrument or product different from the host instrument 120. Each native command can be broken down into a root command and a set of arguments. The set of arguments may be the null set such that there are no arguments appended to the root command. Alternatively, the set of arguments may include one or multiple arguments.

At block 305, the operating mode for the host instrument 120 is selected by the user 160. In one embodiment, the operating mode may toggle between parsing native commands or parsing non-native commands from a command set for a particular alternate instrument. In one embodiment, the operating mode may be selected from a menu of available sets of interpretation rules for various alternate instruments.

The user may use one or more buttons or keys on a front panel of the host instrument 120 to select the operating mode. Alternatively, the user may remotely program the operating mode from the computer 110.

At block 310, the host instrument 120 receives a non-native command from the computer 110 over the remote interface 140, and at block 320, the command interpreter 125 within the host instrument 120 applies the interpretation rules stored in database 230. As a non-limiting example, assume that the host instrument 120 is a pressure controller instrument with its own native command set. A user would send a native command 'PR' from the command set to read the pressure at a device 130. However, a competitor's pressure controller instrument may have a command set that uses the root command 'MAAS?', for example, to get the pressure reading. So the command interpreter 125 uses the interpretation rules to effectively translate the non-native command 'MAAS?' to the native command 'PR' to stimulate a pressure measurement and response.

At block 330, the command interpreter 125 parses the command and takes action responsive to the interpreted command. In the pressure controller example, the root command 'MAAS?' is parsed and the host instrument 120 takes a pressure reading.

At decision block 340, the command interpreter 125 decides whether there is an argument portion of the command that needs to be parsed. In the pressure reading example given above, no arguments were supplied with the command so no arguments need to be parsed. If there are no unparsed arguments to be parsed (block 340—No), the process continues to block 360 (described below).

For a non-limiting example of a command with multiple arguments, the pressure controller may be requested to change the pressure of the device 130 to a particular pressure. The complete request may look like: 'PRES 100 PSI', for example. This request has a root command portion, 'PRES', a first argument '100' that is a numerical value, and a second argument 'PSI' that is a string. Thus, for this request, 100 psi of pressure should be applied to the device 130.

If there is an argument (block 340—Yes), at block 350 the command interpreter 125 parses the first argument and takes action responsive to that argument. For the pressure change example, the first argument, '100' is parsed as a pressure value, and the action to be taken is to wait until the unit string in the second argument is parsed.

The process continues to decision block 340 where the command interpreter 125 again decides if there is another unparsed argument to be parsed. For the pressure change example, there is a second argument, so at block 350, the command interpreter 125 parses the second argument in the request, the string 'PSI'. The second argument provides the units for the numerical pressure value given by the first argument. At this point, the command interpreter 125 can take the action of pressurizing the device 130 to 100 psi. When the process returns to decision block 340, no further arguments are left to be parsed in the request, thus the process continues to block 360.

If there is no unparsed argument remaining to be parsed (block 340—No), at block 360 the command interpreter applies the interpretation rules to determine the response. At decision block 370, the command interpreter 125 decides whether there is any response to be issued. If there is no response to be issued (block 370—No), the process ends at block 399. For the pressure change example above, no response is expected from the host instrument 120, thus the process is complete for this request.

If there is a response to be issued (block 370—Yes), at block 380 the command interpreter 125 transmits a response over the remote interface 140 to the computer 110. For the pressure reading example above, the required response is returning the pressure reading that was obtained by the host instrument 120. The competitor's pressure controller instrument may respond with just a numerical value with no unit of measure included, while the native 'PR' command on the host instrument 120 may return a numerical value with a unit of measure. Thus, the interpretation rules for the command interpreter 125 may format the text response to include only the numerical value of pressure measured in the response. The process ends at block 399.

In addition to interpreting a non-native command to tell the host instrument 120 what actions to take and what response to provide, the interpretation rules also configure the instrument. For a pressure controlling instrument, typically a range of pressures, pressure units of measure, and control characteristics need to be set. However, because the host instrument 120 and the alternate instruments that the host instrument 120 emulates may be very different, the control characteristics relevant to an emulated instrument may not have any meaning or equivalents for the host instrument 120. Thus, the interpretation rules force the host instrument 120 to respond to commands appropriately so that substituting instruments is transparent to the application software running on the computer 110. In other words, if the user application software is written to control a first instrument and expects certain responses from that first instrument, when the host instrument 120 is substituted for the first instrument, the application software must receive the expected responses to prevent a software error from occurring.

Figure 4A:
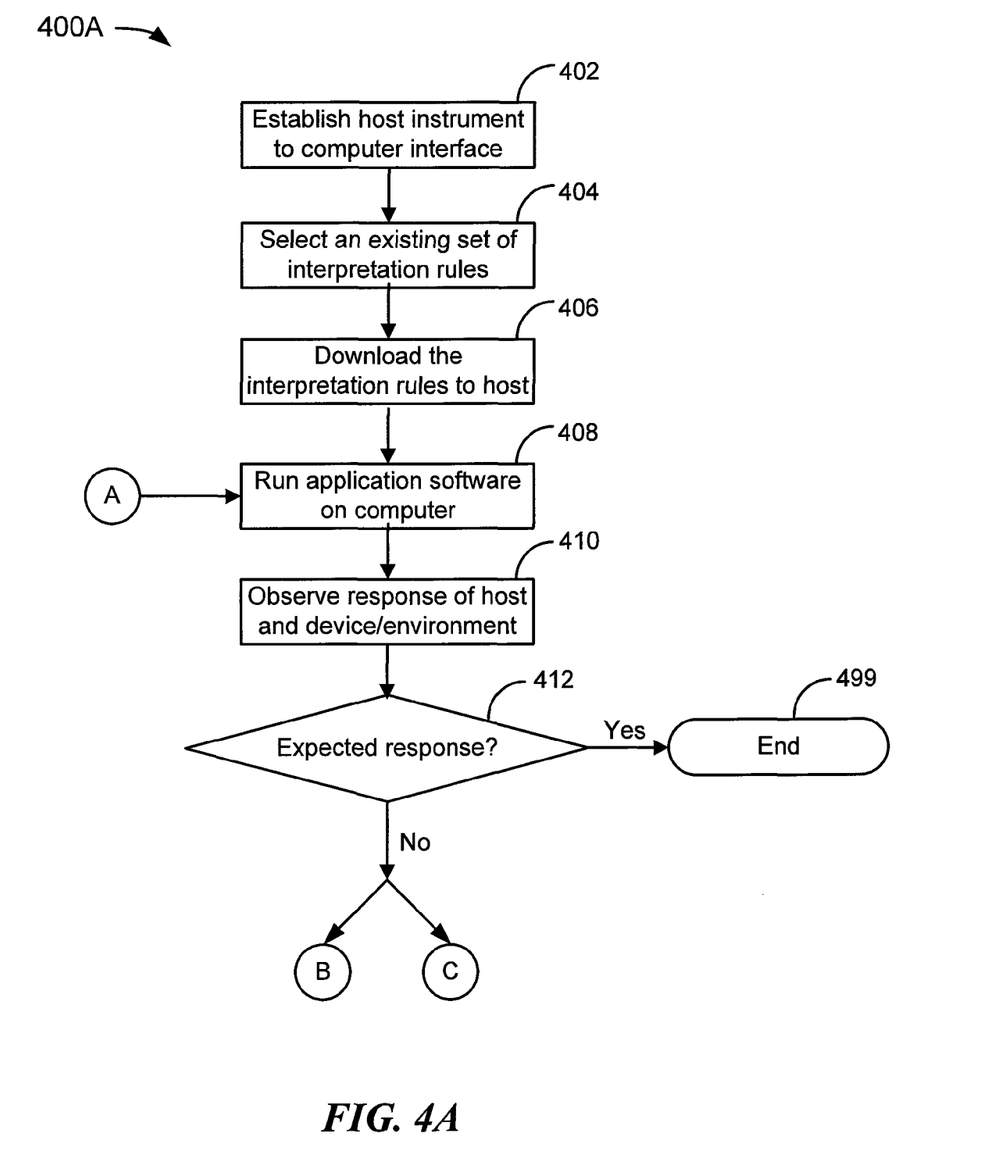
FIG. 4A depicts a flow diagram illustrating an exemplary process of using a set of interpretation rules with a host instrument, according to an embodiment of the disclosure.

FIG. 4A depicts a flow diagram 400A illustrating an exemplary process of using a set of interpretation rules with a host instrument 120, according to one embodiment. At block 402, the user establishes a remote interface 140 between the host instrument 120 and the computer 110.

A list of rules for the command sets of supported alternate instruments is provided by the manufacturer of the host instrument 120 or other interpretation rules service provider for loading onto the computer 110 by the user. At block 404, the user selects an existing set of interpretation rules from available sets of interpretation rules on the computer 110. In one embodiment, a point-and-click interface is provided to the user for selecting an appropriate set of interpretation rules for the host instrument 120 to follow.

At block 406, the user downloads the selected set of interpretation rules to the host instrument 120. The interpretation rules are saved in a database 230 in the host instrument 120. No change of the firmware of the host instrument 120 is needed in order to apply the interpretation rules.

At block 408, the user starts running application software on the computer 110 that is intended to control an alternate instrument that the host instrument 120 is emulating. The user observes the response of the host instrument 120 and/or the device or environment 130 that is being acted upon at block 410.

At decision block 412, the user decides whether the observed responses are the expected responses. If the responses are expected (block 412—Yes), the process ends at block 499. If the responses are not expected (block 412—No), the user has two options. The first option, as described with respect to FIG. 4B below, is for the user to edit the interpretation rules himself. The second option, as described with respect to FIG. 4C below, is for the user to request interpretation rule updates from an interpretation rule provider.

Figure 4B:
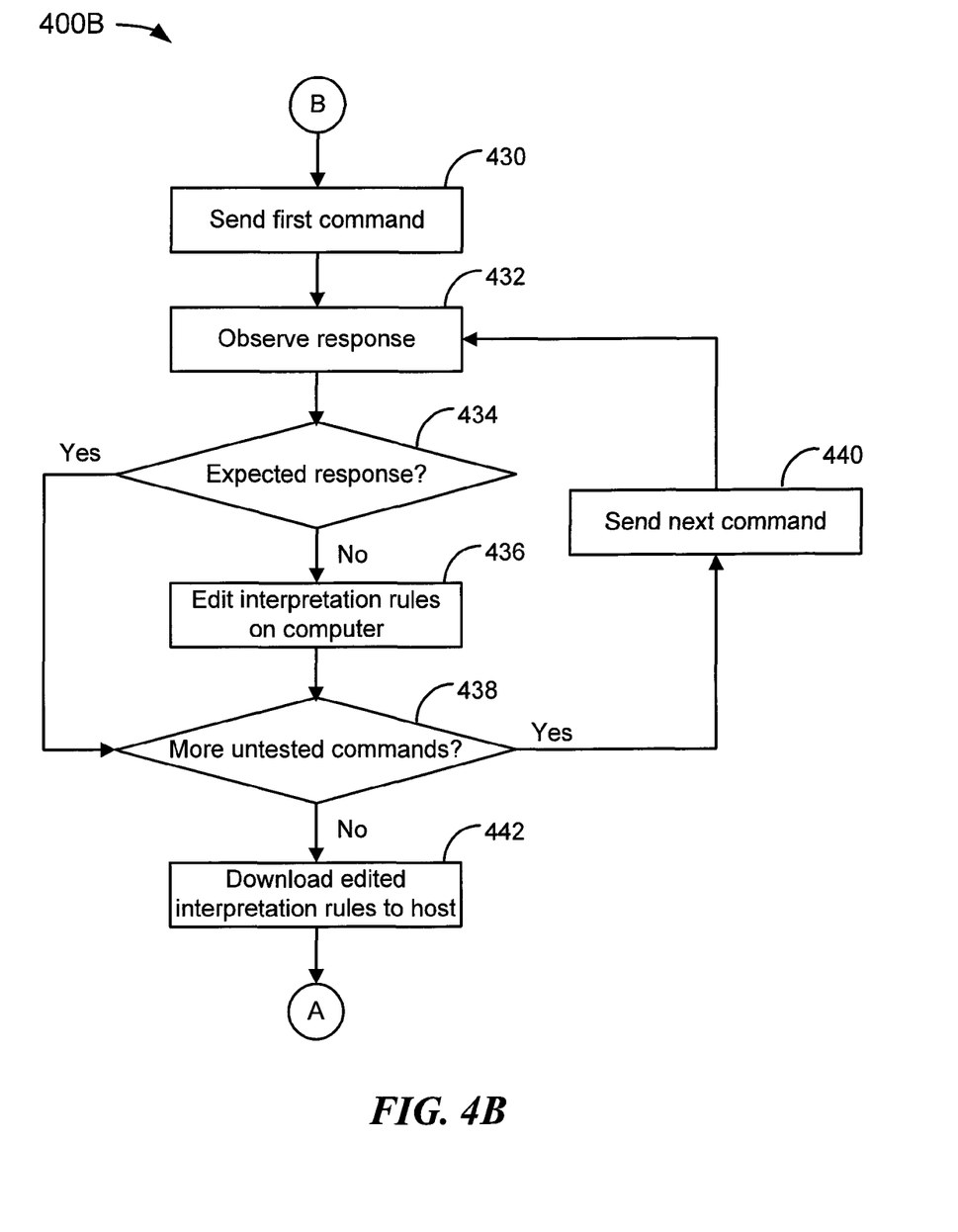
FIG. 4B depicts a flow diagram illustrating an exemplary process of editing interpretation rules, according to an embodiment of the disclosure.

FIG. 4B depicts a flow diagram 400B illustrating an exemplary process of debugging or editing interpretation rules, according to one embodiment. In the process, the user can test each command used by the application software. Alternatively, if the user can identify specific commands that are potentially causing the unexpected responses, the user only needs to test those specific commands. At block 430, the user sends the first command from the computer 110 to be tested on the host instrument 120.

At block 432, the user observes the response of the host instrument 120 and/or the device or environment 130 that is being acted upon. The user decides whether the observed responses are the expected responses at decision block 434. If the response is not expected (block 434—No), at block 436 the user edits the interpreter rules software on the computer 110. The editing may include, but is not limited to, correcting formatting, including or deleting units, adjusting syntax errors, and selecting a different function or property.

At decision block 438, the user decides if there are more untested commands to debug in the application software. If there are more untested commands (block 438—Yes), at block 440 the user sends the next command for testing from the computer 110 to the host instrument 120. The process continues to block 432 where the user observes the response as previously described.

If at decision block 434 the expected response is received (block 434—Yes), the user proceeds to decision block 438 to determine if there are any more untested commands to debug in the application software. If there are no more untested commands (block 438—No), at block 442 the user downloads the edited interpretation rules to the host instrument 120. The process returns to block 408 and continues as described above, where the user may re-test the application software to ensure that the edited interpretation rules work as expected.

Figure 4C:
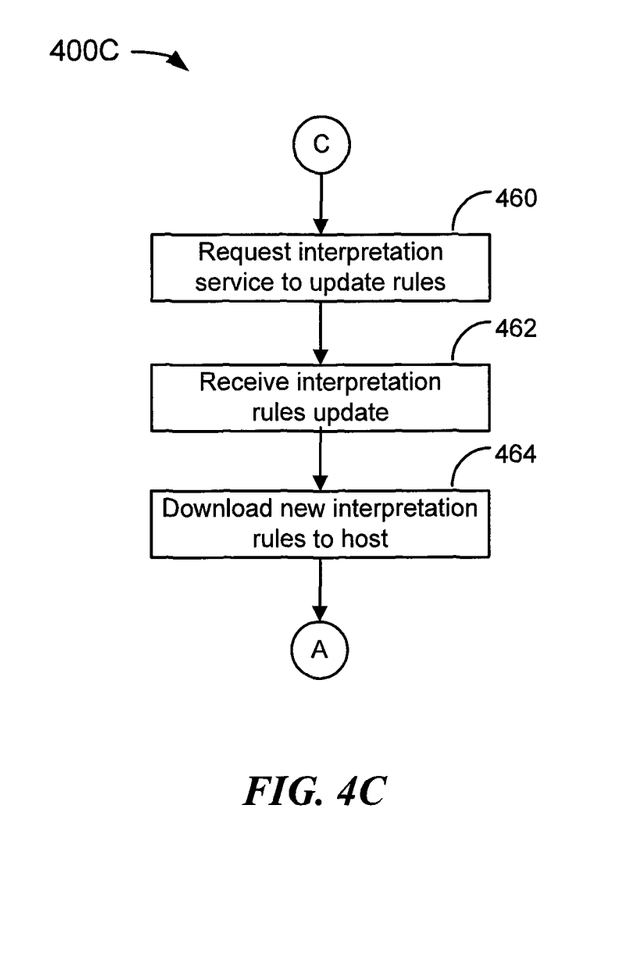
FIG. 4C depicts a flow diagram illustrating an exemplary process of requesting an update to the interpretation rules, according to an embodiment of the disclosure.

FIG. 4C depicts a flow diagram 400C illustrating an exemplary process of requesting interpretation rules updates, according to one embodiment. At block 460, the user requests an interpretation rule service provider, such as the manufacturer of the host instrument 120, to update the interpretation rules as applied to a particular alternate instrument's command set and/or for a particular application of the alternate instrument. The service provider tests and debugs the interpretation rules for a host instrument 120 in a similar manner as provided in flow diagram 400B.

At block 462, the user receives the updated interpretation rules, and at block 464, the user downloads the new interpretation rules to the host instrument 120. The process returns to block 408 and continues as described above with the user's application software controlling the host instrument 120.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method of interpreting a non-native command on a host instrument, comprising:
   receiving a non-native command by the host instrument, wherein the non-native command is part of a command set supported by an alternate instrument to trigger the alternate instrument to perform one or more actions when received;
   in response to receiving the non-native command by the host instrument, applying interpretation rules by the host instrument to the non-native command to determine the one or more actions that the non-native command instructs the alternate instrument to perform, wherein the interpretation rules are pre-defined scripts supported by the host instrument and downloaded to the host instrument without altering a firmware of the host instrument; and
   performing by the host instrument the one or more actions that the alternate instrument performs upon receiving the non-native command.

2. The method of claim 1 wherein a remote interface couples a computer to the host instrument, and the host instrument receives the non-native command from the computer through the remote interface.

3. The method of claim 1, further comprising transmitting by the host instrument one or more responses, wherein the one or more responses are transmitted by the alternate instrument when the alternate instrument is sent the non-native command.

4. The method of claim 3 wherein a remote interface couples a computer to the host instrument, and the host instrument responds to the non-native command from the computer through the remote interface.

5. The method of claim 1 wherein the interpretation rules comprise logical elements and standard functions.

6. The method of claim 1 wherein performing the one or more actions includes operating upon a device or environment.

7. A host instrument for interpreting a non-native command, comprising:
   an interface for receiving the non-native command by the host instrument, wherein the non-native command is part of a command set supported by an alternate instrument to trigger the alternate instrument to perform one or more actions when received, and further wherein the interface includes a physical communication topology;
   means for applying interpretation rules to the non-native command, in response to receiving the non-native command by the host instrument, to determine the one or more actions that the non-native command instructs the alternate instrument to perform, wherein the interpretation rules are pre-defined and downloaded to the host instrument without altering a firmware of the host instrument; and
   a module for performing by the host instrument the one or more actions that the alternate instrument performs upon receiving the non-native command.

8. The host instrument of claim 7, further comprising transmitting one or more responses, wherein the one or more responses are transmitted by the alternate instrument when the alternate instrument receives the non-native command.

9. The host instrument of claim 7 wherein the interpretation rules comprise logical elements and standard functions.

10. The host instrument of claim 7 wherein performing the one or more actions includes operating upon a device or environment.

11. A method of applying interpretation rules to a non-native command on a host instrument, comprising:
    receiving the non-native command at a host instrument, wherein the non-native command is part of a command set supported by an alternate instrument to trigger the alternate instrument to perform one or more actions upon a device or environment when received;

parsing the non-native command into a root command and a set of arguments;

applying the interpretation rules to the root command;

applying the interpretation rules to the set of arguments, if any arguments are present; and acting upon the device or environment responsive to applying the interpretation rules to the root command and the set of arguments, wherein the host instrument responds to the non-native command by performing the one or more actions upon the device or environment that the alternate instrument performs upon receiving the non-native command.

12. The method of claim 11 wherein the interpretation rules are applied to the set of arguments sequentially in the order listed in the non-native command.

13. The method of claim 11 wherein the host instrument is coupled to a computer through a remote interface, and further wherein the host instrument receives the non-native command through the remote interface.

14. The method of claim 11, further comprising:

applying the interpretation rules to determine one or more responses that the alternate instrument transmits in response to receiving the non-native command; and transmitting the one or more responses.

15. The method of claim 14 wherein the host instrument is coupled to a computer through a remote interface, and further wherein the host instrument transmits the one or more responses to the computer through the remote interface.

16. A host instrument capable of interpreting a non-native command, comprising:

a remote interface coupling the host instrument to a computer;

a database for storing interpretation rules for interpreting the non-native command, wherein the non-native command is part of a command set supported by an alternate instrument to trigger the alternate instrument to perform one or more actions when received; and a processor for applying the interpretation rules to the non-native command to determine the one or more actions that the non-native command instructs the alternate instrument to perform;

performing by the host instrument the one or more actions that the alternate instrument performs upon receiving the non-native command.

17. The host instrument of claim 16 wherein the processor further applies the interpretation rules to:

determine one or more responses that the alternate instrument transmits in response to receiving the non-native command; and transmitting the one or more responses.

18. The host instrument of claim 16, further comprising a user interface for allowing a user to directly control the host instrument.

19. A non-transitory computer-readable medium carrying instructions for a method to permit a user to debug a set of interpretation rules for a host instrument, the method comprising:

providing one or more sets of interpretation rules to be selected by a user for downloading to a host instrument;

transmitting one or more non-native commands to the host instrument, wherein the one or more non-native commands is part of a command set supported by an alternate instrument to trigger the alternate instrument to perform one or more actions when received; and providing access to the one or more sets of interpretation rules for editing by the user, wherein the host instrument applies the downloaded and edited interpretation rules to the one or more non-native commands to determine the one or more actions that the one or more non-native commands instruct the alternate instrument to perform;

wherein the edited interpretation rules are subsequently used by the host instrument to interpret the one or more non-native commands to determine the one or more actions and performing by the host instrument the one or more actions that the alternate instrument performs upon receiving the non-native command.

20. The computer-readable medium of claim 19 wherein the one or more non-native commands are part of an application program.

21. The computer-readable medium of claim 19 wherein the one or more non-native commands are individually entered by the user.

22. The computer-readable medium of claim 19 wherein providing one or more sets of interpretation rules to be selected by a user comprises providing a point-and-click user interface.

23. The computer-readable medium of claim 19 wherein each set of interpretation rules corresponds to a different command set, and further wherein each command set corresponds to one or more alternate instruments.

24. The computer-readable medium of claim 19 wherein the computer-readable medium is a memory of a computer system.

* * * * *